United States Patent
Vaia et al.

(10) Patent No.: US 7,141,277 B1
(45) Date of Patent: Nov. 28, 2006

(54) SELF-GENERATING INORGANIC PASSIVATION LAYERS FOR POLYMER-LAYERED SILICATE NANOCOMPOSITES

(75) Inventors: Richard A. Vaia, Beavercreek, OH (US); Hao Fong, Germantown, MD (US); Jeffrey H. Sanders, Vandalia, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 267 days.

(21) Appl. No.: 10/379,215

(22) Filed: Mar. 4, 2003

Related U.S. Application Data

(60) Provisional application No. 60/362,479, filed on Mar. 7, 2002.

(51) Int. Cl.
*B05D 3/06* (2006.01)
*H05H 1/24* (2006.01)
*C23C 14/58* (2006.01)
*C23C 14/08* (2006.01)

(52) U.S. Cl. .................. 427/534; 427/536; 427/539; 427/579

(58) Field of Classification Search ................ 427/534, 427/535, 536, 537, 539, 563, 564, 569, 576, 427/578, 579
See application file for complete search history.

(56) References Cited

U.S. PATENT DOCUMENTS

| | | | |
|---|---|---|---|
| 3,852,249 A * | 12/1974 | Miyabe et al. ........... 525/329.6 |
| 5,955,535 A * | 9/1999 | Vaia et al. ................... 524/791 |
| 5,981,029 A * | 11/1999 | Harada et al. .............. 428/143 |
| 6,004,362 A * | 12/1999 | Seals et al. .................... 51/295 |
| 6,057,035 A | 5/2000 | Singh et al. |
| 6,071,335 A * | 6/2000 | Braggs et al. .............. 106/416 |
| 6,136,908 A | 10/2000 | Liao et al. |
| 6,217,687 B1 * | 4/2001 | Shibata et al. ................ 156/82 |
| 6,224,979 B1 | 5/2001 | Ryang et al. |
| 6,225,374 B1 * | 5/2001 | Vaia et al. ................... 523/216 |
| 6,258,417 B1 | 7/2001 | Goswami et al. |
| 6,261,687 B1 | 7/2001 | Ryang et al. |
| 6,265,038 B1 | 7/2001 | Frisk |
| 6,475,581 B1 * | 11/2002 | Lustig et al. .............. 428/36.6 |
| 6,562,461 B1 * | 5/2003 | Clough ....................... 428/403 |
| 6,863,934 B1 * | 3/2005 | Iida et al. ................... 427/533 |
| 7,013,998 B1 * | 3/2006 | Ray et al. ................... 175/371 |
| 2002/0192416 A1 * | 12/2002 | Hawley et al. ............ 428/40.1 |
| 2005/0008839 A1 * | 1/2005 | Cramer et al. ............. 428/221 |
| 2005/0175831 A1 * | 8/2005 | Kim et al. .................. 428/323 |
| 2005/0192364 A1 * | 9/2005 | Lichtenhan et al. .......... 521/50 |
| 2006/0069177 A1 * | 3/2006 | Sachdev et al. .............. 522/73 |

(Continued)

FOREIGN PATENT DOCUMENTS

JP 56-81344 * 7/1981

(Continued)

OTHER PUBLICATIONS

R.M.Pearl, Gems Minerals Crystals and Ores, The Collector's Encyclopedia, Golden Press, New York, 1967 (no month), excerpt p. 178-179.*

(Continued)

*Primary Examiner*—Marianne Padgett
(74) *Attorney, Agent, or Firm*—AFMCLO/JAZ; Bart S. Hersko

(57) ABSTRACT

A method for preparing high-use temperature, light-weight polymer/inorganic nanocomposite materials with enhanced thermal stability and performance characteristics, which comprises treating a polymer/inorganic nanocomposite material with oxygen plasma under conditions which result in a thin, protective, ceramic-like layer at the surface of the thus-treated nanocomposite material.

6 Claims, 1 Drawing Sheet

U.S. PATENT DOCUMENTS

2006/0079623 A1* 4/2006 Chen .................... 524/445
2006/0122560 A1* 6/2006 Burgmeier et al. ...... 604/96.01
2006/0127583 A1* 6/2006 Lichtenhan et al. ........ 427/331

FOREIGN PATENT DOCUMENTS

| JP | 56-82826 | * | 7/1981 | .............. 522/157 |
|---|---|---|---|---|
| JP | 57-115431 | * | 7/1982 | |
| JP | 62-39236 | * | 2/1987 | |

OTHER PUBLICATIONS

Translation of JP 56-082826 to Kono et al., published Jul. 6, 1981.*

Translation to JP 57-115431 to Junji Mayumi, published Jul. 17, 1982.*

Translation to JP 62-039236 to Michihiko Asai, published Feb. 20, 1987.*

Translation to JP 56-81344 to Kono, published Jul. 3, 1981.*

Hao Fong, Richard A. Vaia, Jeffrey H. Sanders, Derek Lincoln, Peter J. John, Andrew J. Vreugdenhil, John Bultman, Clifford A. Cerbus, Hong G. Jeon, Formation of Self Generating, Inorganic Passivation Layer on Nylon6/Layered Silicate Nanocomposite, Polymer Preprint 2001, 42(1), pp. 354-355, published about Apr. 2001.

* cited by examiner

SELF-GENERATING INORGANIC PASSIVATION LAYERS FOR POLYMER-LAYERED SILICATE NANOCOMPOSITES

CROSS REFERENCE TO RELATED APPLICATION

This application claims priority of the filing date of Provisional Application Ser. No. 60/362,479, filed Mar. 7, 2002, the entire contents of which are incorporated by reference.

RIGHTS OF THE GOVERNMENT

The invention described herein may be manufactured and used by or for the Government of the United States for all governmental purposes without the payment of any royalty.

BACKGROUND OF THE INVENTION

The present invention relates to a method for enhancing the survivability of polymer-inorganic nanocomposites in an aggressive environment.

Nanocomposites are a new class of materials which exhibit ultrafine phase dimensions, typically in the range 1–100 nm. Experimental work on these materials has generally shown that virtually all types and classes of nanocomposites lead to new and improved properties such as increased stiffness, strength, and heat resistance, and decreased moisture absorption, flammability, and permeability, when compared to their micro- and macrocomposite counterparts.

Numerous approaches, generally based on deposition of an inorganic coating on a polymer surface or enrichment of inorganic precursors at a polymer surface in response to exposure to an aggressive environment, have been demonstrated with varying degrees of successes, especially as to the issue of polymer durability in low earth orbit where atomic oxygen flux is very high. Material strategies for imparting durability to polymers in these space environments include direct deposition of a ceramic coating, blending with inorganic polymers and micron-scale fillers, or copolymerization with phosphezenes, phosphonates or siloxanes. These approaches have had limited success due, at least in part, to failure of the coating in service, decreased mechanical and optical properties associated with blending, formation of volatile degradation products and increased cost associated with copolymerization of inorganic monomers.

Accordingly, it is an object of the present invention to provide a method for preparing high-use temperature, lightweight polymer/inorganic nanocomposite materials with enhanced thermal stability and performance characteristics.

Other objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

In accordance with the present invention there is provided a method for preparing high-use temperature, light-weight polymer/inorganic nanocomposite materials with enhanced thermal stability and performance characteristics, which comprises treating a polymer/inorganic nanocomposite material with oxygen plasma under conditions which result in a thin, protective, ceramic-like layer at the surface of the thus-treated nanocomposite material.

DETAILED DESCRIPTION OF THE INVENTION

Figure 1:
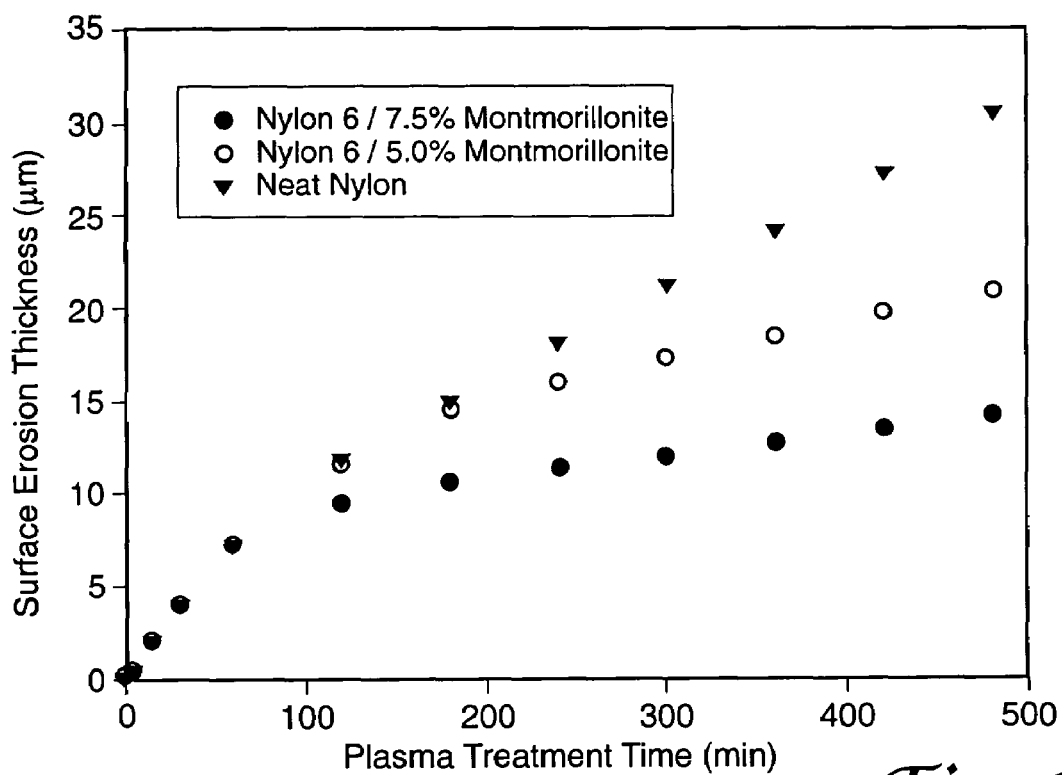
FIG. 1 illustrates the oxygen plasma surface erosion rate of neat Nylon 6, Nylon 6/5.0% layered silicate nanocomposite and Nylon 6/7.5% layered silicate nanocomposite.

The high performance plastics such as polyamide, polyacetal, polycarbonate, polyoxytetramethyleneoxyterephthaloyl, polybutyleneterephthalate, polyethyleneterephthalate, polyimide, polyphenylenesulfide, polysulfone, and polyarylate, as well as epoxy and polyphenylene ether resins may be employed in the practice of this invention.

These plastics are mixed with about 0.1–20 weight percent, preferably about 3–7 weight percent, layered silicate using standard procedures. The term layered silicate includes 1:1 type layered silicates structured by one tetrahedral layer per one octahedral layer and 2:1 type layered silicates structured by two tetrahedral layers per one octahedral layer. The 1:1 type layered silicate may include kaolinite, halloysite, chrysotile, etc. The 2:1 type layered silicate may include a smectite mineral such as montmorillonite, hectorite, beidellite, and saponite; a mica mineral such as muscovite and phlogopite; talc; pyrophyllite; vermiculite; and chlorite. Preferred are montmorillonite, mica and vermiculite, and more preferred is montmorillonite. Such layered minerals are available commercially and comprise platelets which can have a thickness of from 10 to 60 Angstroms and an aspect ratio, i.e., the ratio of the maximum width of a platelet to its thickness, of typically greater than 30. Suitable clays are available from various companies including Nanocor, Inc., Arlington Heights Ill., and Southern Clay Products, Gonzales Tex. The preferred clays are montmorillonite and have a dry particle size range of about 2 to 13 microns.

The polymer-clay composite material is shaped as desired to provide a film, molded, or other shaped article. The thus-shaped composite material is then treated with an oxygen plasma. Such treatment enhances the inorganic content of the material surface, resulting in a tough, robust, conformal inorganic-rich surface, with a tailored concentration gradient into the bulk. It will be recognized by those skilled in the art that a variety of plasma sources are available; accordingly, the extent of treatment cannot be expressed solely in terms of operating parameters and time. Thus, the composite material should be treated with the oxygen plasma to achieve an enhanced silicate layer about 0.05 to 20 µm thick.

The treated composite material has enhanced survivability, relative to the polymer alone and relative to the untreated composite, to a variety of aggressive environments, including plasma, space, thermal oxidative, flammability, electrical discharge and cyrogenic rocket fuels.

The following examples illustrate the invention:

Nylon 6/Montmorillonite nanocomposites with different percentages of Cloisite 30B was received from Southern Clay Products, Inc. in forms of extruded films. In addition to as-received films, solution re-cast films from 1,1,1,3,3,3-Hexa-fluoro-2-propanol solution, and thermo-compressed films using thermo-compressed molding machine, were examined.

Epoxy/Montmorillonite nanocomposites were also examined.

Oxygen plasma was generated using GSC-200 plasma generator (March Instruments, Inc., Concord, Calif.) Oxygen plasma concentration was approximately $10^{18}$ ions (or radical) per liter.

The erosion rate of pristine polymer and the nanocomposites were examined using two recast samples, each approximately 100 μm thick. After 8 hours oxygen plasma erosion, the pristine polymer was almost completely deteriorated, while erosion of the nanocomposite was minimal, with no significant decrease in thickness. The erosion rates were determined by measuring the weight loss after treatment.

Detailed measurements of the oxygen plasma erosion rates of neat Nylon 6, Nylon 6/5.0% layered silicate nanocomposite and Nylon 6/7.5% layered silicate nanocomposite were conducted. The specimens were recast from 1,1,1,3,3,3-Hexa-fluoro-2-propanol solution. As shown in FIG. 1, the long time, equilibrium erosion rates of neat Nylon 6, Nylon 6/5.0% layered silicate nanocomposite and Nylon 6/7.5% layered silicate nanocomposite are about 60 nm/min, 15 nm/min and 10 nm/min, respectively. Thus, formation of the inorganic silicate layer greatly reduced the degradation of the polymer, indicating that the self-generated silicate layer of the nanocomposite is an effective passivation layer.

Figure 2:
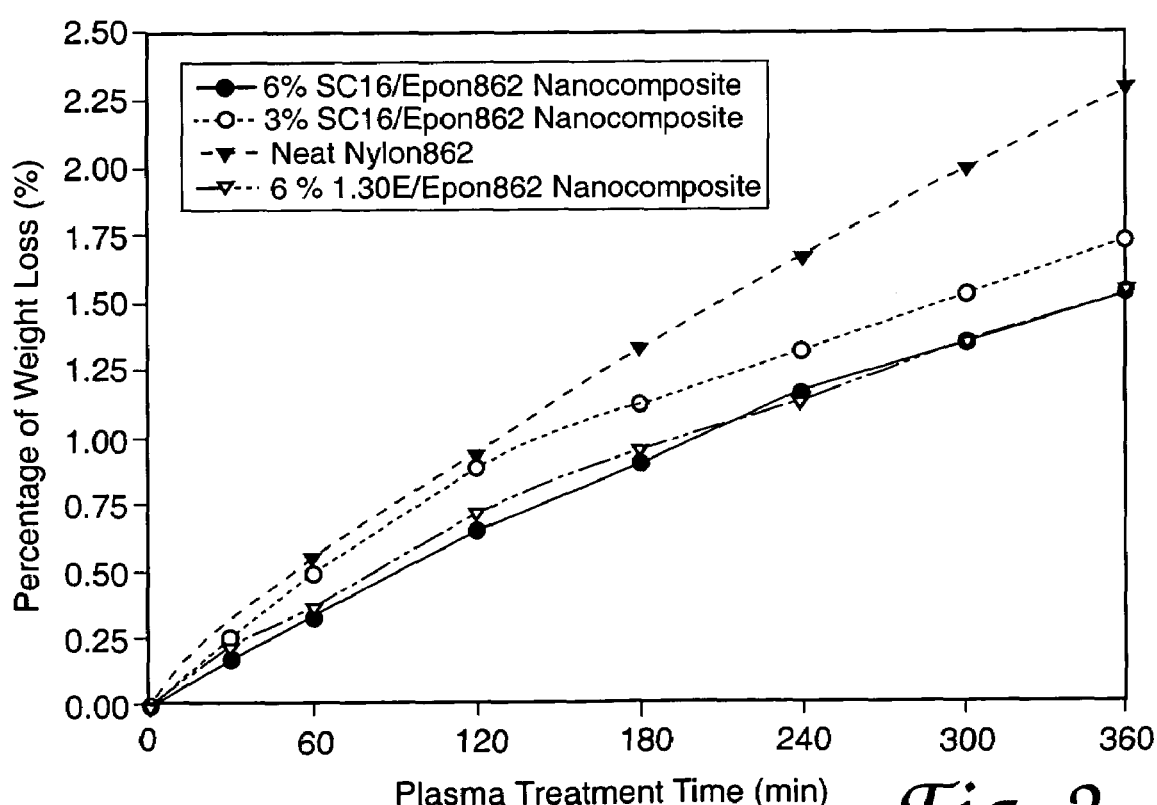
FIG. 2 illustrates the oxygen plasma surface erosion rate of organo-clay epoxy nanocomposites.

Epoxy nanocomposites showed very similar results. These results are shown in FIG. 2. SC16 and I30E are products of Nanocor. Neat epoxy (Epon 862, Resolution Performance Products, Houston Tex.) has a much faster plasma erosion rate than nanocomposites.

Having thus described exemplary embodiments of the present invention, it should be noted by those skilled in the art that the disclosures herein are exemplary only and that alternatives, adaptations and modifications may be made within the scope of the present invention.

We claim:

1. A method for enhancing the thermal stability of a polymer-silicate nanocomposite containing about 0.1–20 weight percent of a 2:1 type layered silicate, which comprises treating said polymer-silicate nanocomposite with oxygen plasma under conditions which result in an enhanced silicate layer of from about 0.05 μm to about 20 μm thick at the surface of the thus-treated polymer-silicate nanocomposite, wherein said polymer-silicate nanocomposite has phase dimensions in the range of 1–100 nm.

2. The method of claim 1 wherein said polymer-silicate nanocomposite comprises a polymer selected from the group consisting of polyamide, polyacetal, polycarbonate, polyoxytetramethyleneoxyterephthaloyl, polybutyleneterephthalate, polyethyleneterephtalate, polyimide, polyphenylenesulfide, polysulfone, polyarylate, and epoxy and polyphenylehe ether resins.

3. The method of claim 1 wherein said polymer-silicate nanocomposite contains about 3–7 weight percent of said silicate.

4. The method of claim 1 wherein said 2:1 type layered silicate is selected from the group consisting of montmorillonite, hectorite, beidellite, saponite, muscovite, phlogopite, talc, pyrophyllite, vermiculite, and chlorite.

5. The method of claim 4 wherein said 2:1 type layered silicate is montmorillonite.

6. The method of claim 2 wherein said 2:1 type layered silicate is montmorillonite.

* * * * *